United States Patent [19]

McLellan et al.

[11] 4,447,151
[45] May 8, 1984

[54] METHOD AND APPARATUS FOR FAST LASER PULSE DETECTION USING GASEOUS PLASMAS

[75] Inventors: Edward J. McLellan, Los Alamos; John A. Webb, Albuquerque, both of N. Mex.

[73] Assignee: The United States of America as represented by the Department of Energy, Washington, D.C.

[21] Appl. No.: 274,917

[22] Filed: Jun. 18, 1981

[51] Int. Cl.$^3$ .......................... G01J 1/42; H01J 40/00
[52] U.S. Cl. .................................... 356/218; 136/254; 250/212; 313/524
[58] Field of Search ................ 356/213, 218; 313/523, 313/524, 538; 250/338, 212; 136/254

[56] References Cited

U.S. PATENT DOCUMENTS 4,264,375 4/1981 Silfvast et al. ................... 313/524

OTHER PUBLICATIONS

"Direct Conversion of CO$_2$ Laser Energy to High Voltage Electrical Energy Using Laser Produced Plasma", Silfvast et al., Applied Physics Letters, vol. 31, No. 11, Dec. 1, 1977, pp. 726–728.

Primary Examiner—Vincent P. McGraw
Attorney, Agent, or Firm—Samuel M. Freund; Paul D. Gaetjens; Michael F. Esposito

[57] ABSTRACT

The method and device of the instant invention is a detector of pulsed laser radiation which utilizes the electromotive force generated by the plasma formed when such radiation is focused onto a surface (1). Measurements are made with a 10.6 μm CO$_2$ laser capable of producing peak intensities of $10^{13}$ W/cm$^2$ when directed through a converging lens (2). Evacuated detector response to such laser intensity is 1 kV signal peak amplitude and subnanosecond risetimes into a 50Ω load (3). Detector performance is found to be greatly altered with the introduction of a background gas (4). For example, with one atmosphere of air, the detector produces prompt signals of the order of 1 V with subnanosecond response for pulse trains lasting 100 ns. With argon, krypton, or zenon at pressures of the order of 10 torr, the detector generates "trigger pulses" of about 250 V amplitude and 0.2 ns risetimes. Such detectors are quite robust when irradiated with high intensity laser radiation and are useful for qualitative laser beam monitoring.

9 Claims, 6 Drawing Figures

METHOD AND APPARATUS FOR FAST LASER PULSE DETECTION USING GASEOUS PLASMAS

The United States Government has rights in this invention pursuant to Contract No. W-7405-ENG-36 between the U.S. Department of Energy and the University of California.

BACKGROUND OF THE INVENTION

The present invention relates generally to laser radiation detectors and more particularly to laser-induced plasma generated electromotive force used for detector and monitoring of the temporal characteristics of pulsed laser output.

When a high-power laser is focused onto a target some portion of the target surface material is vaporized and ionized forming a plasma. Electrons appearing in the ionization process move much more rapidly than the simultaneously formed ions because of their smaller mass, and a certain fraction have sufficient energy to move away from the surface on which they originated leaving the ions behind. This effect can produce large voltages if the target is electrically insulated from any surrounding conducting surfaces. That is, the electrons striking the outlying walls can produce a voltage relative to the target material which is enveloped by ions which have not had time enough to leave its environs. A return circuit including a resistive element allows useful power to be generated as these electrons return to the target and recombine with the ions still there. It turns out that a significant number of electrons are traveling at superthermal velocities. That is, some of the electrons are moving much faster than would be predicted from the plasma temperature. There are many explanations for this phenomenon, none of which concerns us here. It will be seen, below, that these "hot" electrons give rise to the unique characteristics of our invention.

The device and method of the instant invention is a room temperature, fast, and robust laser radiation detector useful for the investigation of laser pulses. Electron emission from plasmas produced by focused, pulsed laser radiation gives rise to electrical signals which can be utilized for beam diagnostics or synchronization. The invention has a risetime, voltage output and response duration which can be adjusted by varying gas pressure and type. Under suitable conditions the detector can be made to have a faster risetime and longer accurate response duration than existing detectors using thermal electron characteristics. It can also be made more difficult to saturate. Pulses of 250 V amplitude into 50Ω can be generated without further amplification under conditions where the risetime is less than 0.2 ns using a 10.6 $\mu$m laser source. At higher pressures, an approximately 1 V signal with even faster temporal characteristics reproduces a laser pulse train lasting 100 ns. The invention is therefore a good qualitative laser beam monitor as well as a detector. The absence of measurable delay time between the rise in detector signal and the incident laser pulse enable the device and method of the instant invention to be useful as a fast trigger source.

The generation of high voltage transients by focused $CO_2$ laser radiation for energy conversion has been reported by W. T. Silfvast and L. H. Szeto in Appl. Phys. Letters 31, 726 (1977). The authors discuss therein the use of a device similar to that of the instant invention as a laser detector. However, this article teaches away from the method and device of the instant invention in several critical ways. First, the method proposed and executed by Silfvast and Szeto describes the evacuation of their detector cell to $10^{-2}$ torr or lower. We have found that by adding various gases to pressures as high as one atmosphere, the temporal resolution of the device can be significantly improved. The desired decrease in detector response time is accompanied by a reduction in the voltage generated for a particular laser energy, but even at atmospheric pressure, the signals are of the order of one volt. FIG. 3 of the Silfvast and Szeto article shows no fine structure on the detector output signal, while the laser pulse has significant structure. Our invention is capable of following such short-term laser fluctuations accurately because of the laser driven, non-thermal characteristics of the signals produced by the "hot" electron phenomenon. In fact, it should be noted that it provides subnanosecond response time and high voltage output even when evacuated, whereas Silfvast and Szeto report about 8 ns response for their detector. We have further discovered that by varying the gas pressure and its composition the duration of the detector response can be adjusted. It is seen from FIG. 3 of Silfvast and Szeto that their detector signal drops off in less than one-half the time of the laser pulse decay. The explanation tendered by the authors is that the space-charge effect prevents the high-energy electrons from reaching the detector walls at longer times. Since the instant invention relies on "hot" electron emissions, i.e., those electrons which have sufficient energy to pass through the gas present to the conducting walls, the space-charge effect becomes less important and the response duration increases. At still longer times, our invention can be made to cut off additional laser signals since the gas becomes conducting and effectively shorts the device. The detector is there acting as a plasma switch and terminates the 10.6 $\mu$m radiation reaching the detector cathode. Control of detector response time and duration coupled with an approximately factor of 100 improvement in fastest response time, then, are the critical features which distinguish the method and device of the instant invention from existing technology. Finally, the dimensions of our device are such that the saturation effect graphically described by FIG. 5 of Silfvast and Szeto is not observed at the maximum intensity attainable by us during our experiments; namely, about $10^{13}$ W/cm$^2$. In their FIG. 5, it is seen that saturation has already set in at this intensity level. That is, the change in detector signal per change in laser intensity becomes small. This advantage further distinguishes the device of the instant invention from that of Silfvast and Szeto.

SUMMARY OF THE INVENTION

An object of the device and method of the instant invention is to provide a fast, robust, room temperature detector and monitor for high intensity pulsed laser radiation.

Another object is to provide a laser radiation detector where the desired temporal characteristics can be balanced against the signal output; a device set up to monitor longer risetime laser pulses giving a much higher voltage output than one which can follow very rapidly varying pulses for the same laser radiation input intensity.

Another object of our invention is to produce prompt electrical signals for synchronization of other devices with a laser source.

Yet another object is to provide a plasma switch which can selectively respond to the earlier pulse in a train of laser radiation pulses.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention as embodied and broadly described herein, the device of this invention may comprise a target disk cathode at which "hot" electrons are generated surrounded by and insulated from a cylindrically symmetric conducting surface anode, a converging lens, an evacuatable chamber which contains said electrodes and lens, and which allows laser light to reach said target disk after being focused through said lens, and means for measuring and recording very rapid voltage changes generated across said electrodes. In a further aspect of the present invention, in accordance with its objects and purposes, the method hereof may also comprise evacuating and backfilling said chamber with a variety of gases to selected pressures. Ar, Kr, or Xe at pressure of about 10 torr produce a useful triggering source in a preferred embodiment of the invention.

Benefits and advantages achieved by the device and method of the instant invention are as follows. First, by adjusting the detector gas pressure and composition, the response time can be varied to encompass the range from ten to one hundred times faster than existing pulsed laser radiation detectors utilizing thermal electron emission from plasmas thereby produced, to risetimes ten times that of these devices when the device of the instant invention is operated with the chamber evacuated. That is, with no gas present in the chamber our invention has ten times the temporal response as devices of similar construction. Second, the device of the instant invention does not saturate at as low laser intensity as the closest art. Further, the duration of the detector response can also be varied by changing the gas pressure and composition. As discussed above, the closest art does not follow laser pulses accurately because of the space-charge effect. Our invention allows prompt, accurate reproduction of laser pulses. Moreover, at appropriate gas pressures, our device and method can act as a plasma switch, shorting out subsequent laser pulses. That is, only the first pulse in a train can be made to be effective in producing a signal for synchronization of other devices. Finally, the present invention can be easily constructed and is very robust.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 4 is an oscilloscope trace of a similar feature to that shown in FIG. 4 using a high-speed pyroelectric detector.

DETAILED DESCRIPTION OF THE PREFERRED EMBODIMENT OF THE INVENTION

Reference will now be made in detail to the present preferred embodiment of the invention, an example of which is illustrated in the accompanying drawings.

Figure 1:
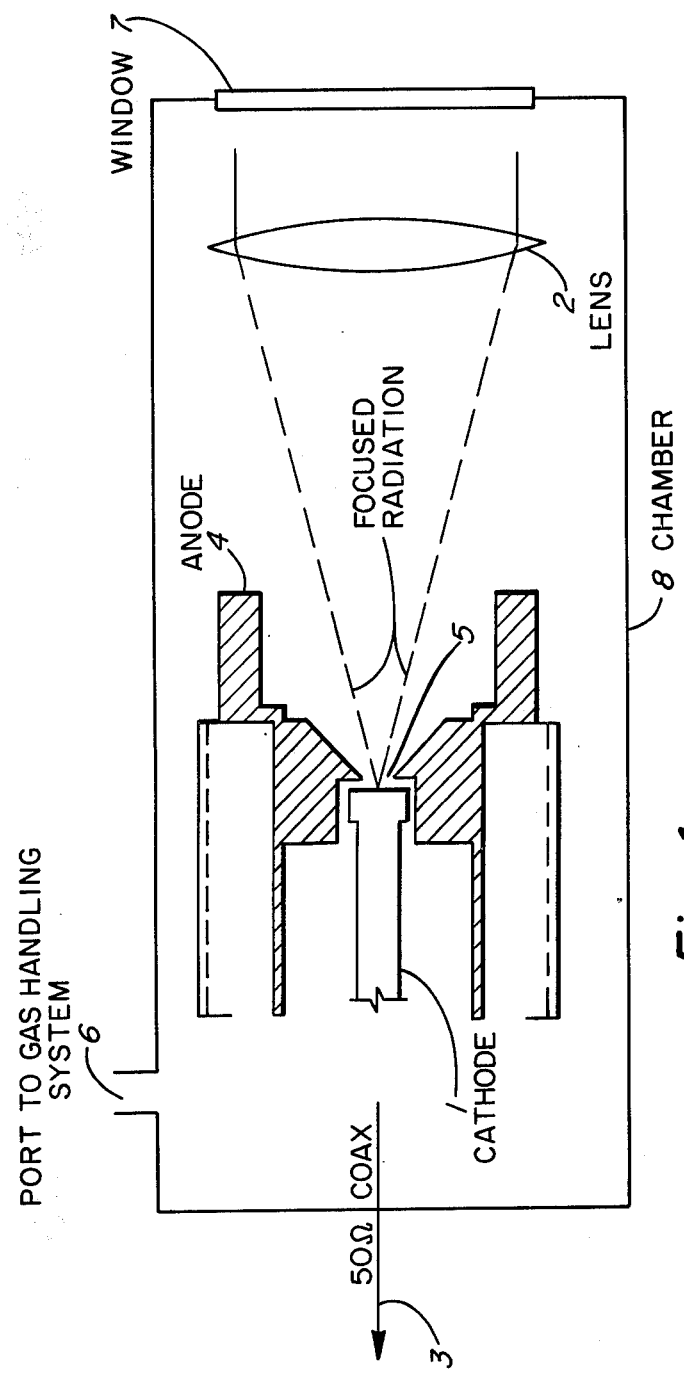
FIG. 1 is a schematic of the device of the instant invention.

FIG. 1 shows the mechanical details of the detector of the instant invention which has cylindrical symmetry. The diameter of the entrance hole 5 is about 0.24 cm and it is located about 0.06 cm in front of the target disk cathode 1. Said disk and surrounding electron collecting metal anode surfaces 4 are matched into a 50Ω coaxial cable 3. Means are provided for measuring and recording voltage signals produced by said detector in response to laser radiation input. Means are also provided for focusing said laser radiation. Because of the occurrence of gas break down (depending on gas pressure and laser intensity) the focusing means may be located either inside or outside of an evacuatable, gas tight chamber 8 which surrounds the anode-cathode assembly, and which can be backfilled through a port 6 with a variety of gases to specified pressures by means of a suitable gas handling system. A window 7 is provided to transmit either focused laser radiation to the cathode or unfocused laser light to the means of focusing the radiation depending on whether the means of focusing is outside or inside of the chamber, respectively. Since a $CO_2$ laser is used for testing our invention, preferably such means includes a 5 cm focal length ZnSe lens 2 placed about 5 cm from said cathode to focus the about 0.7 cm diameter laser beam onto this electrode.

Figure 2:
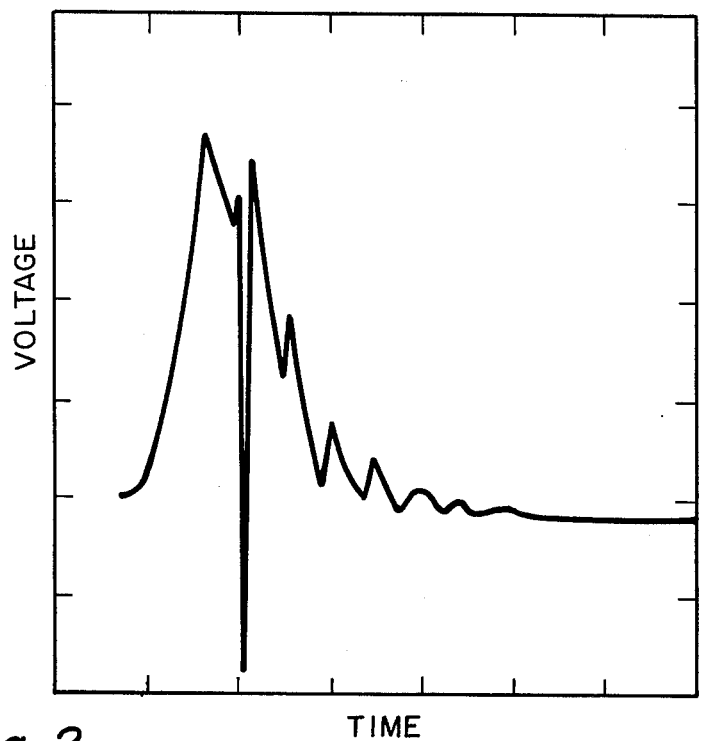
FIG. 2 is an oscilloscope trace of the output from the detector operating with 580 torr of air in the chamber in response to "partially smoothed" $CO_2$ oscillator radiation.

FIG. 2 displays the output signal from our detector operating with atmospheric pressure of air (580 Torr at Los Alamos National Laboratory). It is to be compared with FIG. 3 which shows a similar signal detected by a photon-drag detector which generally provides an accurate representation of the laser output but which is far more costly and difficult to use than our invention. The timescale for both oscilloscope traces is 20 ns/cm. Although the device of the instant invention gives a good, qualititave reproduction of the laser behavior, the baseline can shift some fraction of a volt depending upon the detector gas pressure and composition, and the alignment. This shift may be due to changes in the distribution of the plasma from pulse to pulse.

Figure 3:
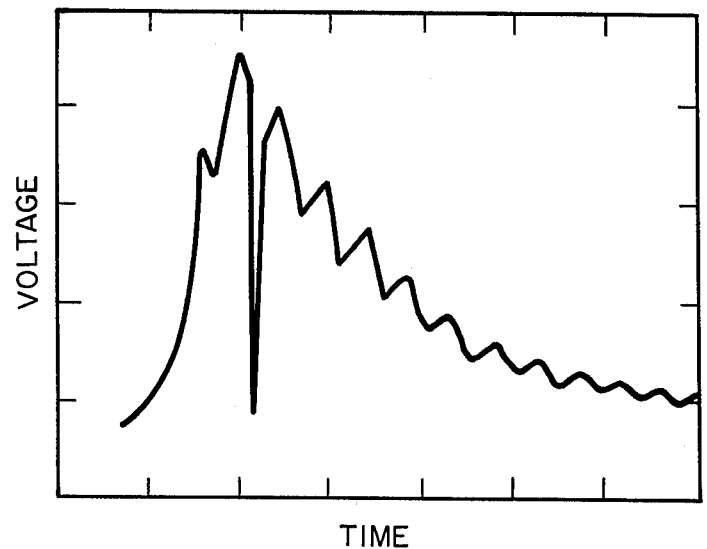
FIG. 3 is a trace using a photon drag detector of a laser pulse similar to that displayed in FIG. 2.

Of particular interest in FIGS. 2 and 3 are the negative-going spikes. They result from the passage of the $CO_2$ output pulses through a pockels cell placed between the laser and the detectors. Such a device is capable of "switching" out short segments of the laser pulse by a rapid change in polarization of its various elements. Therefore, the spike represents a brief drop in the detector signal resulting from a short-duration segment of the laser pulse being reflected away from the detector's sensitive area. The spike in FIG. 2 is seen to extend below the baseline. This is another illustration of the "hot" electron effect which is the basis of the instant invention. Since the effect is driven by the strong electric field of the laser pulse, when it is turned off momentarily, the electrons emitted from the cathode region can return there much more rapidly than any positively charged ions in the surrounding plasma. The detector output therefore swings negative for a brief period while charge equilibrium is being restored.

Figure 5:
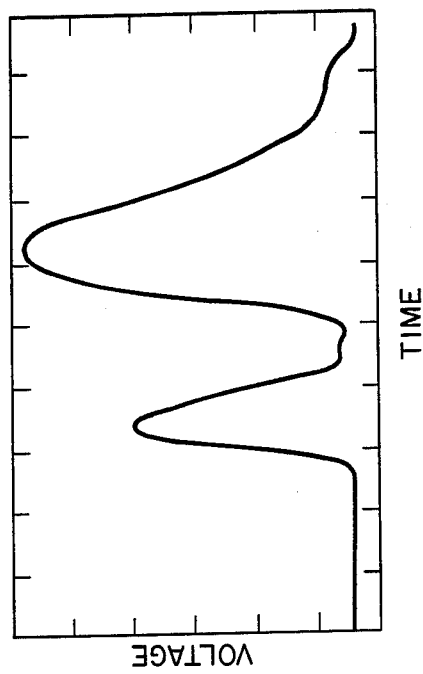
Figure 4:
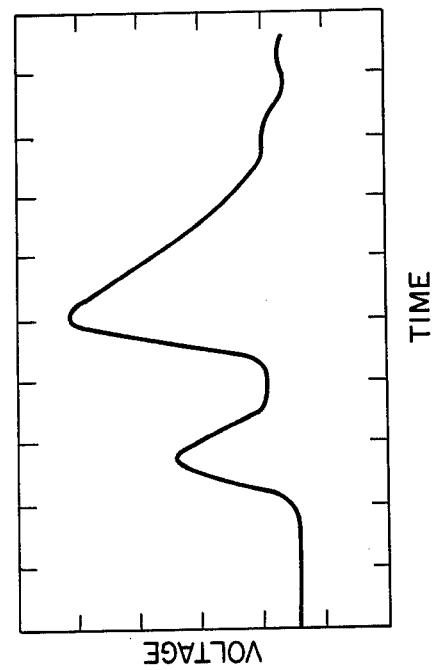
FIG. 4 is an oscilloscope trace of part of a $CO_2$ laser pulsed impinging on the detector of the instant invention operating in the evacuated mode.

FIGS. 4 and 5 show oscilloscope traces of that portion of the laser light "switched" out or reflected from the path of the major part of the pulse by the pockels cell. The two features in each figure result from very rapid and accurate temporal response of the detectors to changes in the light reflected as the polarization of the pockels cell changes. FIG. 4 represents the output from the device of the instant invention, while FIG. 5 is that of a high-speed pyroelectric detector. The timescale is 500 ps/cm. It is essential to be aware that the detector of the instant invention is being operated in the evacuated mode in FIG. 4. Although this way of operating the detector has a much slower time response than when gas is introduced as described above, it is seen that the risetime of our detector is less than 0.5 ns, while Silfvast and Szeto, supra, report 7-8 ns for their detector which operates on thermal electrons as opposed to the "hot" electrons of the instant invention. Also to be noted is that it is likely that risetimes capable of being followed by the device and method of the instant invention are of the order of 70 ps. Data to substantiate this claim is not available since the shortest pulses we have been able to generate derive from the pulse switching speed of the pockels cell which in the instant case is slower (approximately 90 ps).

Evacuation of the chamber increases the signal level by a factor of several hundred, but the high frequency components of the signal disappear within 10-20 ns of the initial rise. Possibly the plasma expands into the vacuum and begins to short the detector. Under these conditions, our invention behaves in a similar fashion to other plasma originated thermal electron emission detectors.

Figure 6:
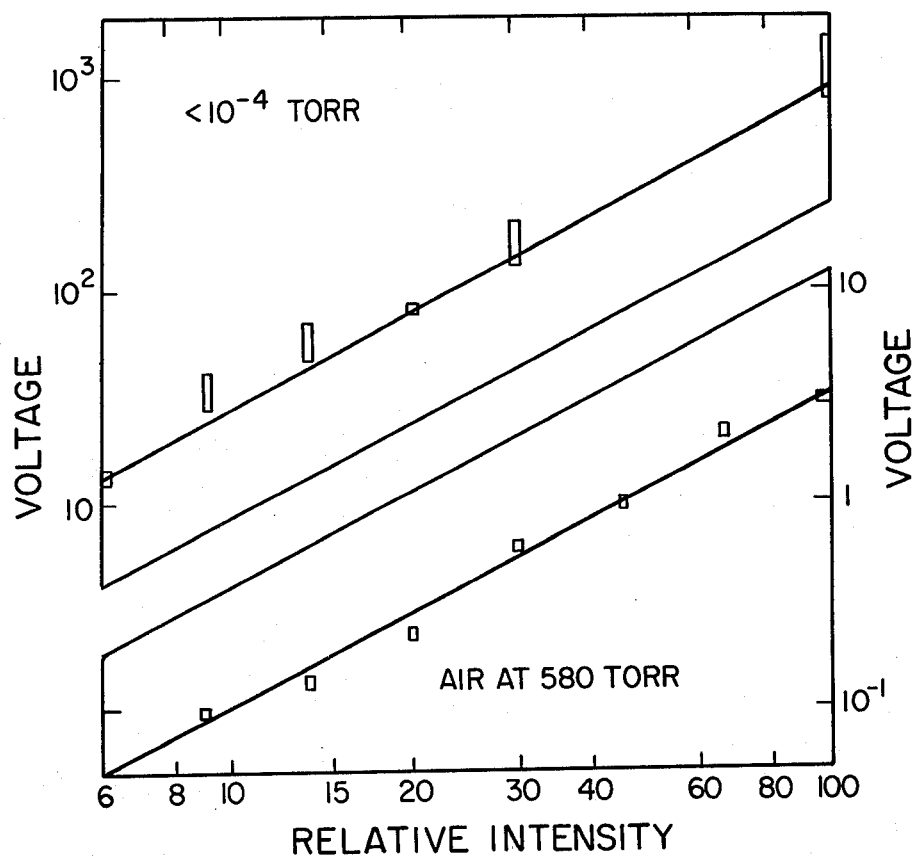
FIG. 6 is a plot of peak voltages produced by the detector as a function of relative input intensity from a 1 ns $CO_2$ laser pulse.

FIG. 6 shows that even when evacuated, our invention does not saturate at laser intensities up to $10^{13}$ W/cm$^2$, in contrast to those of the existing art. In the laser intensity variation experiments, CaF$_2$ attenuators were used and the peak output voltage for both the evacuated and gas-filled modes of operation of our detector appears to scale in proportion to the input intensity to the 3/2 power.

Fortuitously, it was found that back-filling with Ar, Kr, or Xe to pressures of the order of 10 torr produces a fast triggering source. For example, with a 100 mJ, 1 ns CO$_2$ laser pulse incident on the detector we found that increasing argon fill pressure from 6 to 18 torr produces electrical pulses which drop from 500 V to 300 V peak voltage but also drop from 210 ps to 180 ps in 10-90% risetime. This implies an actual risetime of 150 ps for the 180 ps observation. Further, at 14 torr of argon, attenuation of the incident laser pulse from 100 mJ to 10 mJ caused the peak voltage to decrease from 320 V to 190 V with a corresponding increase in the 10-90% risetime to 160 ps. Our general experience is that temporal response of the detector improves with increasing input power. It is possible that the detector risetime is shortened when gases are added to the chamber because the "hot" electrons produced by the plasma must have some minimum energy to travel through the background gas any appreciable distance. This qualification virtually eliminates the slow moving electrons which would lengthen the detector response time at the expense of the size of the voltage output. In addition, the presence of the gas provides some electron multiplication. Indeed, slightly larger peak signals are observed from the detector when filled with 1 torr of Ar, than when evacuated. Finally, when more than several torr of argon is present in the detector chamber, the instant invention behaves like a plasma switch which can terminate the 10.6 $\mu$m radiation reaching the detector cathode. That is, when a complicated laser output such as a pulse train reaches the detector operating in this manner, only the first pulse is detected.

In summary, then, the method and device of the instant invention known as a "hot" electron plasma detector provides a variety of different detection characteristics in a single, inexpensive, robust, room temperature unit. Among the advantages of our invention are the ability to vary the response time and duration of the detector by varying the gas fill pressure and composition, the freedom from saturation to beyond $10^{13}$ W/cm$^2$, the utility of the device as a plasma switch, substantial voltage output, and most importantly, the subnanosecond response capability in a virtually indestructible package. Slight geometrical changes give rise to the instant invention's freedom from saturation effects to quite high laser intensity, while the other novel characteristics which lead to the advantage mentioned above, derived from the fortuitous finding that such "hot" electron detectors undergo significant changes when filled with certain gases.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. Apparatus for detection and monitoring of subnanosecond risetime, intense, pulsed laser radiation utilizing the "hot" electron phenomenon comprising in combination:
   (a) means for generating and collecting "hot" electrons which comprises:
      (i) a conducting circular disk cathode;
      (ii) a conducting, cylindrically symmetric electron collecting anode which is insulated from and coaxial with said cathode and which has means of disposal as a part thereof forming a circular entrance hole adjacent to and having a smaller diameter than said cathode; and
      (iii) a transition structure to allow said anode and cathode to make electrical contact with an about 50Ω impedance coaxial cable without significant mismatch;
   (b) means for focusing incident laser radiation onto said cathode
   (c) means for detecting and recording voltages changing in subnanosecond timescale which are produced from said "hot" electrons having traveled from said cathode to said anode as a result of said focused laser radiation impinging on said cathode.

2. The apparatus of claim 1 which also comprises:
(i) means forming a gas tight chamber encompassing said anode and said cathode;
(ii) means for evacuating or filling said chamber with subject gases to specified pressures; and
(iii) means for transmitting said incident laser radiation to said means for focusing said incident laser radiation onto said cathode through said chamber.

3. The apparatus of claim 1 which also comprises:
(i) means forming a gas tight chamber encompassing said anode and said cathode;
(ii) means for evacuating or filling said chamber with select gases to specified pressures; and
(iii) means for transmitting said focused incident radiation onto said cathode through said chamber.

4. The apparatus of claim 2 wherein said cathode is about 0.3 cm in diameter and wherein said entrance hole is about 0.24 cm in diameter and located about 0.06 cm away from said cathode.

5. The apparatus of claim 3 wherein said cathode is about 0.3 cm in diameter and wherein said entrance hole is about 0.24 cm in diameter and located about 0.06 cm away from said cathode.

6. The apparatus of claim 4 wherein said means of focusing said indicent laser radiation is an about 5 cm focal length ZnSe lens located about 5 cm from said entrance hole.

7. The apparatus of claim 5 wherein said means of focusing said incident laser radiation is about 5 cm focal length ZnSe lens located about 5 cm from said entrance hole.

8. A method for and monitoring subnanosecond risetime, intense, pulsed laser radiation utilizing the "hot" electron phenomenon in a gas tight chamber having an anode, a cathode, means for extracting an electrical signal from said cathode, and means for permitting the pulsed laser radiation to enter said gas tight chamber, said method comprising the steps of:
(a) filling said gas tight chamber with a selected gas;
(b) adjusting the pressure of said selected gas to give a desired temporal response for said "hot" electrons;
(c) Focusing said pulsed laser radiation;
(d) directing said focused pulsed laser radiation onto said cathode whereby a plasma is formed in the vicinity thereof and said "hot" electrons are emitted therefrom, said "hot" electrons traveling to said anode and producing a rapidly changing voltage on said cathode relative to said anode thereby; and
(e) detecting and recording said rapidly changing voltage in a subnanosecond timescale, said voltage being produced from said "hot" electrons having traveled from said cathode to said anode as a result of said focused laser radiation impinging on said cathode.

9. The method as described in claim 8, wherein said gas is selected from the group consisting of Ar, Kr, Xe, air, and mixtures thereof at pressures up to atmospheric pressure.

* * * * *